United States Patent
Kim et al.

(10) Patent No.: US 10,139,298 B2
(45) Date of Patent: Nov. 27, 2018

(54) APPARATUS AND METHOD FOR DETECTING DRIVER'S HANDS-OFF

(71) Applicants: Hyundai Motor Company, Seoul (KR); Kia Motors Corporation, Seoul (KR)

(72) Inventors: Hoi Won Kim, Gwacheon-si (KR); Dae Young Kim, Gwanmyeong-si (KR); Min Yong Shin, Seoul (KR); Dong Gu Lee, Seoul (KR); Dong Eon Oh, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/632,114

(22) Filed: Jun. 23, 2017

(65) Prior Publication Data

US 2018/0172528 A1   Jun. 21, 2018

(30) Foreign Application Priority Data

Dec. 15, 2016 (KR) .................. 10-2016-0171745

(51) Int. Cl.
| | | |
|---|---|---|
| *B60Q 1/00* | (2006.01) | |
| *G01L 5/22* | (2006.01) | |
| *B60K 28/06* | (2006.01) | |
| *G06F 3/01* | (2006.01) | |

(52) U.S. Cl.
CPC ............ *G01L 5/221* (2013.01); *B60K 28/066* (2013.01); *G06F 3/015* (2013.01)

(58) Field of Classification Search
CPC ........ G01L 5/221; B60K 28/066; G06F 3/015
USPC ................................. 340/439, 425.5
See application file for complete search history.

(56) References Cited

U.S. PATENT DOCUMENTS

| | | | |
|---|---|---|---|
| 2003/0144801 A1* | 7/2003 | Braeuchle ............ | B60Q 1/0076 702/56 |
| 2013/0158771 A1 | 6/2013 | Kauffmann | |
| 2016/0107597 A1 | 4/2016 | Won et al. | |

FOREIGN PATENT DOCUMENTS

| | | |
|---|---|---|
| JP | 2016-107682 A | 6/2013 |
| KR | 10-0535010 B1 | 12/2005 |
| KR | 10-2015-0092886 A | 8/2015 |
| KR | 10-2016-005785 A | 5/2016 |

* cited by examiner

*Primary Examiner* — Daryl Pope
(74) *Attorney, Agent, or Firm* — Morgan, Lewis & Bockius LLP (57) ABSTRACT

An apparatus and a method for detecting a driver's hands-off may include a torque sensor that detects a torque signal generated from a steering wheel of a vehicle, a vibration generator that generates a reference vibration to the steering wheel of the vehicle, a filter that extracts a torque signal of a vibration frequency band from the detected torque signal, and a controller that activates the vibration generator when a change rate of the detected torque signal exceeds a threshold value and determines whether the driver's hands-off occurs based on a change of the torque signal extracted by the filter.

17 Claims, 5 Drawing Sheets

APPARATUS AND METHOD FOR DETECTING DRIVER'S HANDS-OFF

CROSS-REFERENCE TO RELATED APPLICATION

The present application is based on and claims the benefit of priority to Korean Patent Application No. 10-2016-0171745, filed on Dec. 15, 2016, in the Korean Intellectual Property Office, the entire contents of which is incorporated herein for all purposes by this reference.

BACKGROUND OF THE INVENTION

Field of the Invention

The present invention relates to an apparatus and a method for detecting a driver's hands-off, and more particularly, to a technique configured for detecting driver's hands-off even when a driver gently touches the steering wheel of a vehicle without firmly grasping the steering wheel.

Description of Related Art

Various dangerous situations may occur due to a driver's intention or others in a traveling vehicle. For example, when the driver leaves a lane on which the vehicle is currently traveling due to driver's carelessness, a vehicle in the next lane excessively approaches, the driver does not grasp the steering wheel, or the driver is driving in a drowsy state, a dangerous situation may occur.

In the conventional technique of detecting a driver's hands-off, a torque signal generated by an operation of the steering wheel of the driver is sensed through a torque sensor mounted on the steering wheel of a vehicle and it is detected whether the driver is hands-off based on the torque signal. That is, the torque signal sensed by a torque sensor is filtered through a low pass filter (LTO, and calculates a change rate (a change amount of torque per hour) of the filtered torque signal. When the calculated change rate of the torque signal exceeds a threshold value, it is determined that the driver's hands-off occurs and a warning sound is output.

Since the conventional technique of detecting a driver's hands-off detects whether the driver's hands-off occurs based on the change rate of the torque signal generated by the driver, even when the driver lightly touches the steering wheel, the driver's hands-off is erroneously determined and an alarm sound is output.

Therefore, according to the conventional technique of detecting a driver's hands-off, when a driver lightly touches the steering wheel of the vehicle, the driver's state may be erroneously determined as a hands-off state so that a warning sound is output even though the actual driver lightly holds the steering wheel of the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for detecting a driver's hands-off which can primarily determine whether the driver's hands-off occurs, based on the change rate of a torque signal generated by the steering wheel operation of a driver, and apply a reference vibration to the steering wheel to finally determine whether the driver's hands-off occurs, based on a change of the torque signal caused by the applying of the reference vibration, so that the driver's hands-off is detected even when the driver gently touches the steering wheel of the vehicle without firmly grasping the steering wheel.

The technical problems to be solved by the present inventive concept are not limited to the aforementioned problems, and any other technical problems not mentioned herein will be clearly understood from the following description by those skilled in the art to which the present invention pertains.

In an aspect of the present invention, there is provided an apparatus for detecting a driver's hands-off, which includes a torque sensor that detects a torque signal generated from a steering wheel of a vehicle, a vibration generator that generates a reference vibration to the steering wheel of the vehicle, a filter that extracts a torque signal of a vibration frequency band from the detected torque signal, and a controller that activates the vibration generator when a change rate of the detected torque signal exceeds a threshold value and determines whether the driver's hands-off occurs based on a change of the torque signal extracted by the filter.

The controller may determine that a driver is in a hands-on state when the torque signal extracted by the filter is attenuated to be less than a reference torque signal, and may determine that, the driver is in a hands-off state when the torque signal is not attenuated.

The controller may output a warning sound when the controller determines that a driver is in a hands-off state.

According to various aspects of the present invention, there is provided an apparatus for detecting a driver's hands-off, which includes a torque sensor that detects a torque signal generated from a steering wheel of a vehicle, an impedimetric sensor that measures an impedance of a driver from the steering wheel of the vehicle, and a controller that determines whether the driver's hands-off occurs based on a change of the impedance measured by the impedimetric sensor when a change rate of the measured torque signal does not exceed a threshold value.

The controller may determine that, the driver is in a hands-off state when a difference between a reference impedance and the impedance measured by the impedimetric sensor exceeds the threshold value, and may determine that the driver is in a hands-on state when the difference does not exceed the threshold value.

The controller may output a warning sound when the controller determines that the driver is in a hands-off state.

According to still another aspect of the present invention, there is provided a method of detecting a driver's hands-off, which includes sensing, by a torque sensor, a first torque signal generated from a steering wheel of a vehicle, activating, by a controller, a vibration generator configured to provide a reference vibration to the steering wheel of the vehicle when a change rate of the detected first torque signal does not exceed a threshold value, sensing, by the torque sensor, a second torque signal generated from the steering wheel of the vehicle, extracting a torque signal of a vibration frequency band from a second torque signal, and determining, by the controller, whether the driver's hands-off occurs based on a change of the extracted torque signal.

The determining of the driver's hands-off may include determining that a driver is in a hands-on state when the torque signal of the vibration frequency band is attenuated to be less than a reference torque signal, and determining that the driver is in a hands-off state when the torque signal is not attenuated.

The method may further include outputting a warning sound when it is determined that a driver is in a hands-off state.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

The above and other objects, features and advantages of the present invention will be more clearly understood from the following detailed description taken in conjunction with the accompanying drawings, and thus the technical idea of the present invention will be easily embodied by those skilled in the art. In addition, a detailed description of well-known features or functions will be ruled out in order not to unnecessarily obscure the gist of the present invention. Hereinafter, exemplary embodiments of the present invention will be described in detail with reference to the accompanying drawings.

In an exemplary embodiment of the present invention, the hands-off of a driver means that the hands of the driver are not touched to the steering wheel of a vehicle while the vehicle is driven, and the hands-on of a driver means that the hands of the driver are touched to the steering wheel of a vehicle while the vehicle is driven.

Figure 1:
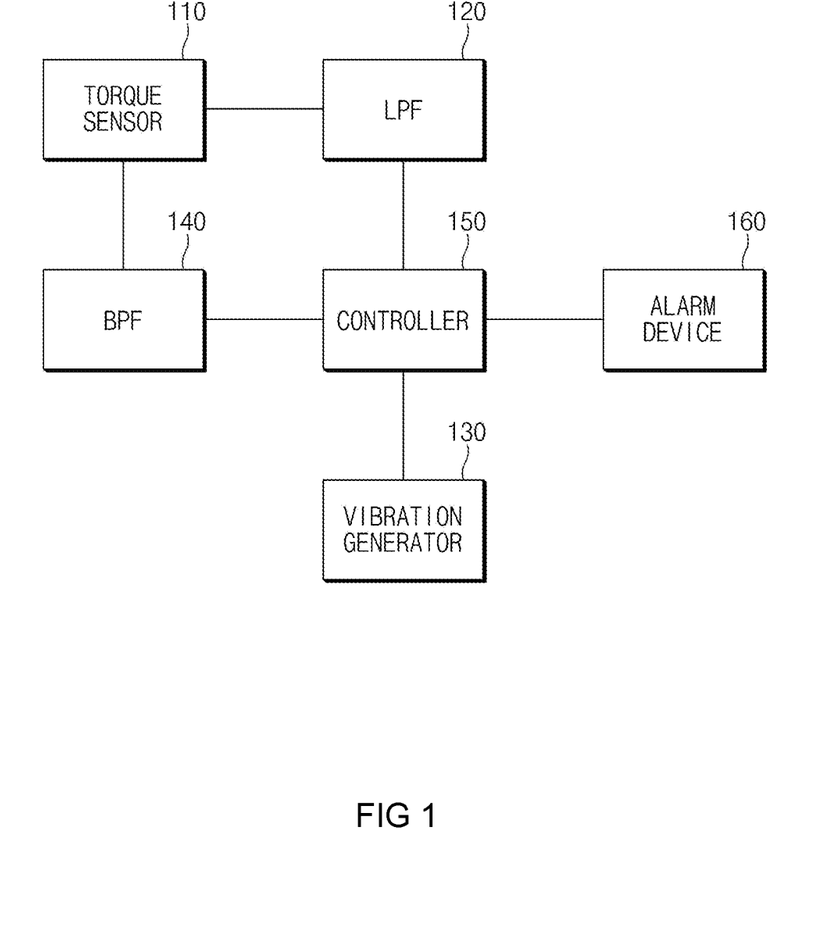
FIG. 1 is a block diagram illustrating an apparatus for detecting a driver's hands-off according to an exemplary embodiment of the present invention.

FIG. 1 is a block diagram illustrating an apparatus for detecting a driver's hands-off according to an exemplary embodiment of the present invention.

As shown in FIG. 1, an apparatus for detecting a driver's hands-off includes a torque sensor 110, a low pass filter (LPF) 120, a vibration generator 130, a band pass filter (BPF) 140, a controller 150, and an alarm device 160.

Referring to each component described above, the torque sensor 110, which is a sensor for detecting a torque signal, detects a torque signal generated from the steering wheel of a vehicle.

The torque sensor 110 includes a magnetic type torque sensor and an optical type torque sensor.

In the case of the magnetic type torque sensor, when a driver rotates a steering wheel, an input column is rotated, a torsion bar is twisted, and an output column is rotated. In the instant case, the input column rotates more than the output column because the wheel friction is transmitted to the output column.

In addition, the area of a first detection ring coupled to the input column, which is opposite to a second detection ring coupled to the torsion bar, is substantially unchanged, but the opposite area of a third detection ring coupled to the second detection ring and the output column is changed by the rotational difference between the input and output columns. Thus, the inductance values of a first coil provided to the second detection ring and a second coil provided to the third detection ring are changed.

Therefore, the controller measures a change in the inductance value of the first coil with respect to the inductance value of the second coil to measure the rotational deviation between the steering wheel and the wheel.

In the case of the optical type torque sensor, an input disk and an output disk are respectively coupled to the input column and the output column, while facing each other, and an optical pipe (a light emitting device) and an optical sensor (a light receiving device) are provided at upper and low sides based on both disks, such that the light of the optical pipe transmitting through the disks is received by the optical sensor.

Thus, when the torsion bar is twisted by the rotation of the steering wheel so that the rotation angles of both disks change, the amount of light passing through both disks changes. When the light sensor detects the changed amount of transmitted light and transmits the detected amount of light to the controller, the controller measures the rotational deviation between the steering wheel and the wheel based on the signal transmitted from the optical sensor.

Next, the LPF 120 low-pass filters the torque signal detected by the torque sensor 110 to remove noise.

The vibration generator 130 may be implemented with a motor. The vibration generator 130 is driven under control of the controller 150 to generate a vibration (reference vibration) having a predetermined magnitude on the steering wheel of the vehicle. The vibration generator 130 is controlled by a pulse width modulation (PWM) signal to generate the vibration (reference vibration) having the predetermined magnitude.

The vibration generator 130 may be implemented with a motor provided separately to the steering wheel of the vehicle, with a motor provided in a motor driven power steering (MDPS) system provided in the vehicle, or with an active suspension (AS). In the instant case, the vibration caused by the AS is an up/down vibration.

The BPF 140 band-pass filters the torque signal detected by the torque sensor 110 after the vibration generated by the vibration generator 130 is applied to the steering wheel. That is, only the torque signal in the vibration frequency band is passed. In the instant case, when the driver does not touch the steering wheel, the band-pass filtered torque signal meets the reference value, but when the driver touches the steering wheel, the bandpass filtered torque signal is attenuated to fail to meet the reference value.

The controller 150 performs overall control so that each of the components can normally perform the function.

When the change rate of the torque signal passing through the LPF 120 exceeds the threshold value, the controller 150 determines that the driver is touching the steering wheel of the vehicle with the driver's hands (hands-on state). In the instant case, when it is determined that the driver normally drives the vehicle, the alarm sound is not output.

Meanwhile, when the change rate of the torque signal passing through the LPF 120 does not exceed the threshold value, the controller 150 firstly determines that the driver is in the hands-off state and activates the vibration generator 130 to allow the reference vibration to be applied to the steering wheel.

Then, the controller 150 determines whether the driver is hands-off based on the change of the torque signal filtered by the BPF 140 (whether the torque signal is attenuated). In the instant case, the torque filtered by the BPF 140 indicates a torque signal detected by the torque sensor 110 after the reference vibration is applied to the steering wheel by the vibration generator 130.

Therefore, the controller 150 activates the vibration generator 130 to allow the reference vibration to be applied to the steering wheel of the vehicle. When the result of band-pass filtering the torque signal detected by the torque sensor 110 is attenuated to be less than the reference torque signal, the controller 150 determines that the driver is not in the hands-off state. When not attenuated, the controller 150 determines that the driver is in the hands-off state. In the instant case, the controller 150 outputs a warning sound through the alarm device 160 when it is determined that the driver is in the hands-off state.

Hereinafter, referring to FIG. 2 and FIG. 3, the operation of the controller 150 will be described in more detail.

Figure 2:
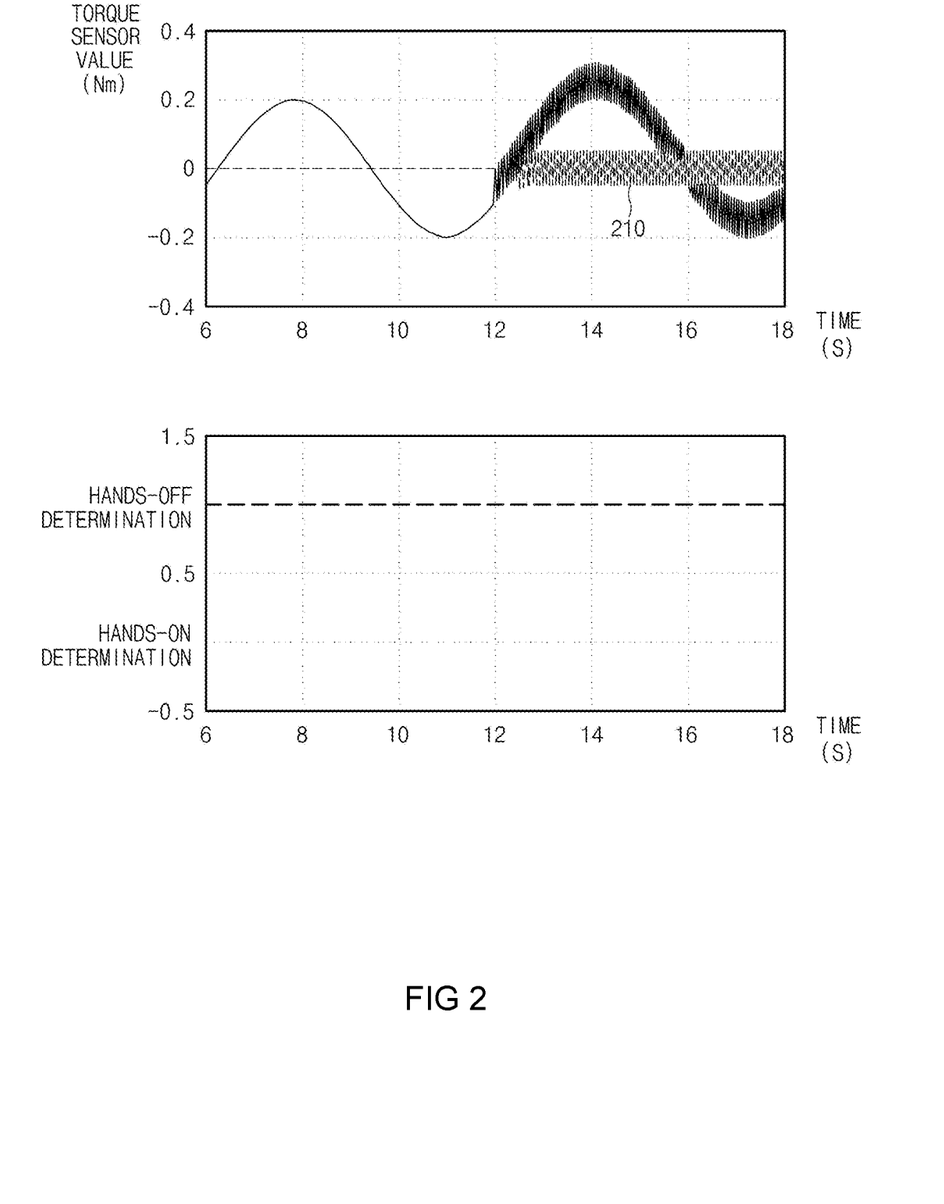
FIG. 2 is a view illustrating a performance analysis of an apparatus for detecting a driver's hands-off according to an exemplary embodiment of the present invention.

FIG. 2 is a view illustrating a performance analysis of an apparatus for detecting a driver's hands-off according to an exemplary embodiment of the present invention. FIG. 2 illustrates the result of detecting a driver's hands-off.

In FIG. 2, the torque sensor value of a sinusoidal wave form is a torque value generated by the operation of the driver and is distributed between −0.2 and +0.2.

When the vibration generator 130 is activated at a time point of 12 seconds, as the result of applying the reference vibration to the steering wheel of the vehicle, it may be understood that a torque 210 corresponding to the vibration component is generated. Since the generated torque signal 210 meets the reference value, that is, the attenuation does not occur in the torque signal 210, the controller 150 determines that the driver is in the hands-off state.

Figure 3:
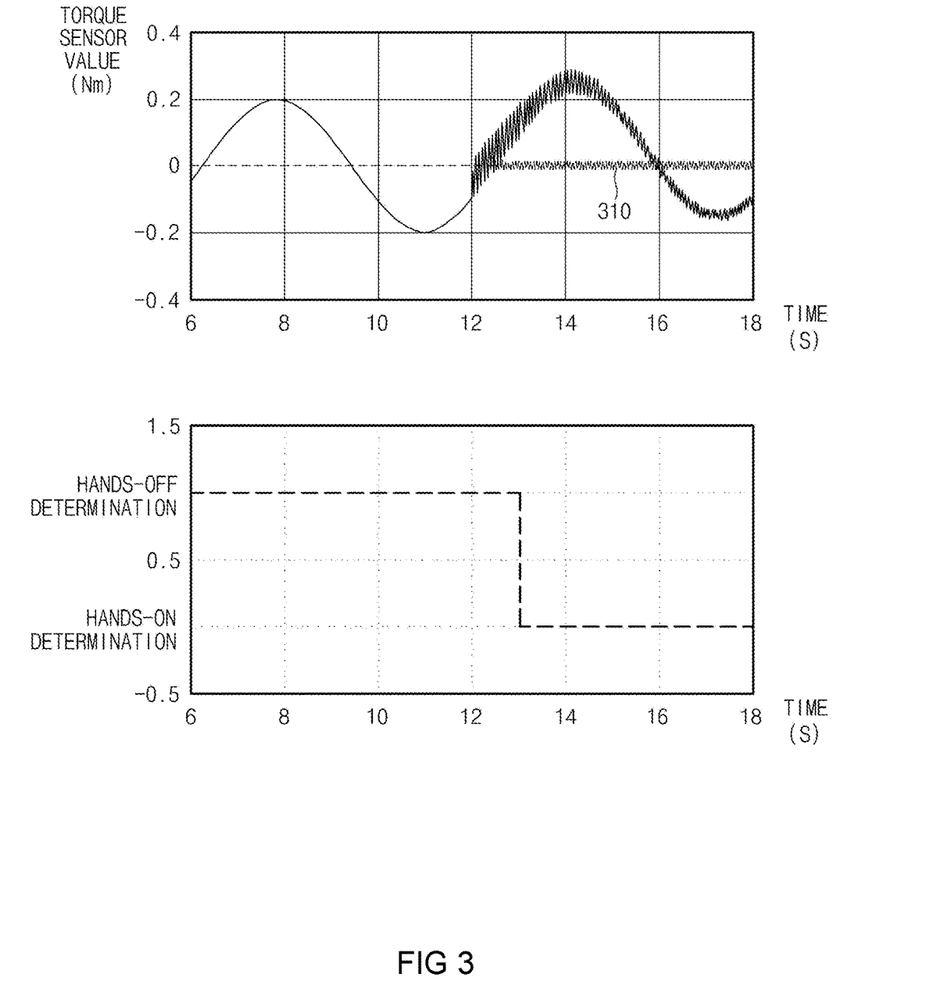
FIG. 3 is a view illustrating a performance analysis of an apparatus for detecting a driver's hands-off according to another exemplary embodiment of the present invention.

FIG. 3 is a view illustrating a performance analysis of an apparatus for detecting a driver's hands-off according to another exemplary embodiment of the present invention. FIG. 3 illustrates the result of the controller 150 detecting the hands-on state of the driver.

In FIG. 3, the torque sensor value of a sinusoidal wave form is a torque value generated by the operation of the driver and is distributed between −0.2 and +0.2.

Likewise, when the vibration generator 130 is activated at a time point of 12 seconds, as the result of applying the reference vibration to the steering wheel of the vehicle, it may be understood that a torque signal 210 corresponding to the vibration component is generated. In the instant case, it may be understood that the torque signal 310 is attenuated when compared with the torque signal 210 of FIG. 2. That is, it may be understood that the torque signal 310 does not meet the reference value.

Therefore, the controller 150 determines that the driver is in the hands-on state.

After all, the controller 150 determines whether the driver is in the hands-off state or the hands-on state, based on the change (attenuation) of the torque signals 210 or 310 generated in the hands-off state or the hands-on state of the driver.

Figure 4:
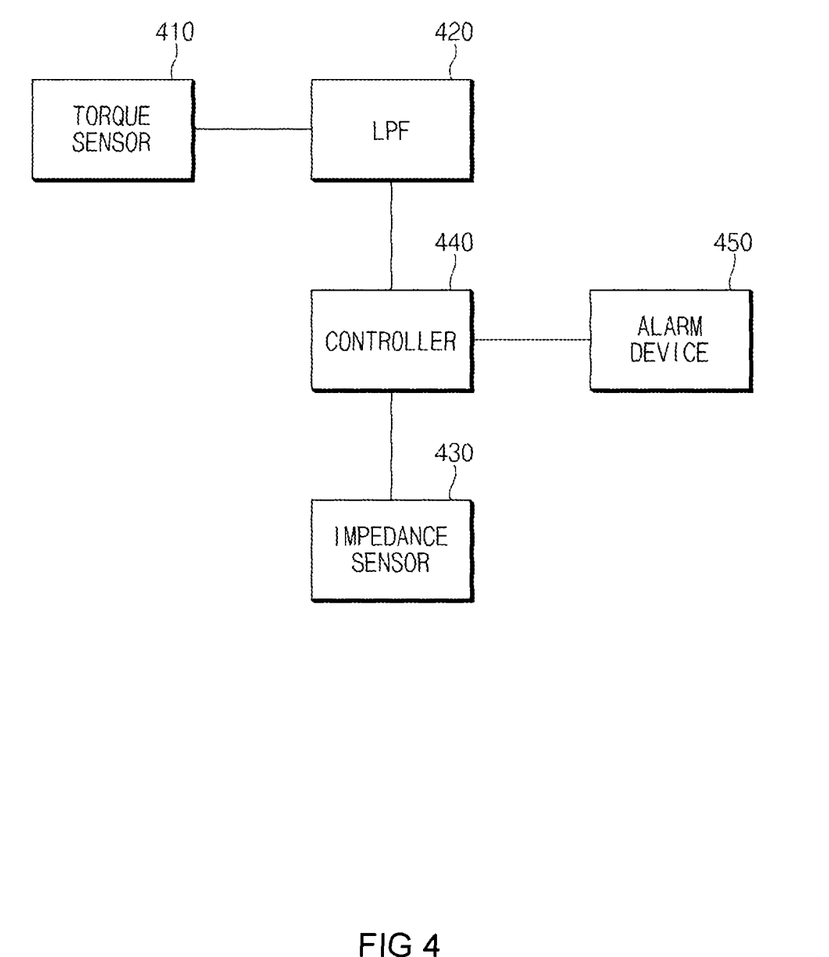
FIG. 4 is a block diagram illustrating an apparatus for detecting a driver's hands-off according to another exemplary embodiment of the present invention.

FIG. 4 is a block diagram illustrating an apparatus for detecting a driver's hands-off according to another exemplary embodiment of the present invention.

As illustrated in FIG. 4, an apparatus for detecting a driver's hands-off according to an exemplary embodiment of the present invention includes a torque sensor 410, an LPF 420, an impedimetric sensor 430, a controller 440, and an alarm device 450. In the instant case, the functions of the torque sensor 410 and the LPF 420 are the same as those of the torque sensor 110 shown in FIG. 1, and thus the detailed description thereof will be omitted.

The impedimetric sensor 430 is activated under control of the controller 440 to measure the impedance of the driver. That is, a current for measuring impedance is applied to the steering wheel, such that the impedance changed depending on whether the driver touches the steering wheel is measured.

When the change rate of the torque signal passing through the LPF 420 exceeds the threshold value, the controller 440 determines that the driver touches the steering wheel of the vehicle with the driver's hands (hands-on state). In the instant case, when it is determined that the driver normally drives the vehicle, the alarm sound is not output.

Meanwhile, when the change rate of the torque signal passing through the LPF 420 does not exceed the threshold value, the controller 150 firstly determines that the driver is in the hands-off state and activates the impedimetric sensor 430 to measure impedance from the steering wheel.

Thereafter, when the difference ($Z_{Diff}$) between the reference impedance ($Z_{Str}$) and the impedance ($Z_{StrDriver}$) measured by the impedimetric sensor 430 exceeds the threshold value ($Z_{HandOff}$), the controller 440 determines that the driver is in the hands-off state. If not, the controller 440 determines that the driver is in the hands-on state. That is, the controller 440 may determine whether the driver is in the hands-off state based on following Equation 1.

$$Z_{Diff}=Z_{Str}-Z_{StrDriver}$$

if ($Z_{Diff}<Z_{HandOff}$), then Hands-Off　　　[Equation 1]

In addition, the controller 150 outputs a warning sound through the alarm device 160 when it is determined that the driver is in the hands-off state.

Figure 5:
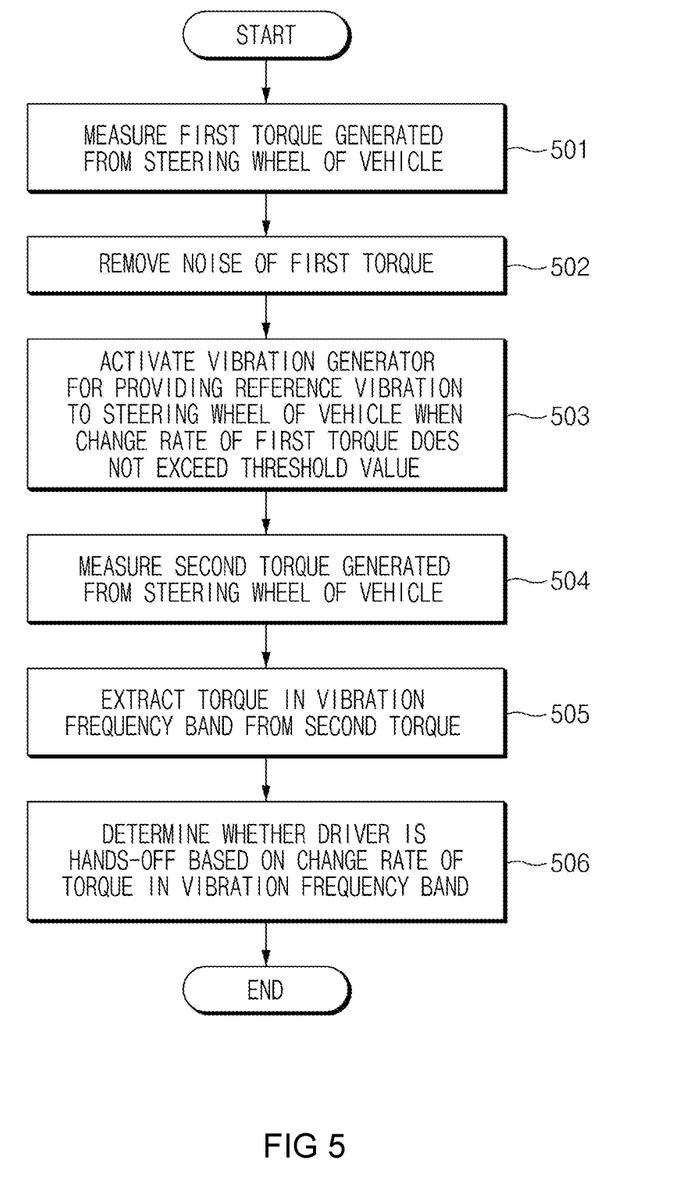
FIG. 5 is flowchart illustrating a method for detecting a driver's hands-off according to an exemplary embodiment of the present invention.

FIG. 5 is flowchart illustrating a method for detecting a driver's hands-off according to an exemplary embodiment of the present invention.

First, in operation 501, the torque sensor 110 measures a first torque signal generated by the steering wheel of the vehicle.

In operation 502, the LPF 120 removes the noise of the first torque signal measured by the torque sensor 110.

In operation 503, when the change rate of the first torque signal passing through the LPF 120 does not exceed the threshold value, the controller 150 activates the vibration generator 130 for providing the reference vibration to the steering wheel of the vehicle.

In operation 504, the torque sensor 110 detects the second torque signal generated from the steering wheel of the vehicle.

In operation 505, the BPF 140 extracts the torque signal in the vibration frequency band from the second torque signal.

In operation 506, the controller 150 determines whether the driver is in the hands-off state, based on the change of the torque signal in the vibration frequency band.

The method according to an exemplary embodiment of the present invention may be recorded as a computer program. A code and a code segment constituting the program may be readily inferred by a computer programmer in the field. In addition, the program may be stored in computer-readable recording media (information storage media) and may be read and executed by a computer, thereby implementing the method of the present invention. The recording media may include any types of computer-readable recording media.

According to an exemplary embodiment of the present invention, it may be primarily determined whether the driver's hands-off occurs, based on the change rate of a torque signal generated by the steering wheel operation of a driver, the reference vibration may be applied to the steering wheel to finally determine whether the driver's hands-off occurs, based on the change of the torque signal caused by the applying of the reference vibration, so that the driver's hands-off is detected even when the driver gently touches the steering wheel of the vehicle without firmly grasping the steering wheel.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for detecting a driver's hands-off, the apparatus comprising:
a torque sensor configured to detect a torque signal generated from a steering wheel of a vehicle;
a vibration generator configured to generate a reference vibration to the steering wheel of the vehicle;
a filter configured to extract a torque signal of a vibration frequency band from the detected torque signal; and
a controller configured to activate the vibration generator when a change rate of the detected torque signal exceeds a threshold value and to determine whether the driver's hands-off occurs based on a change of the torque signal extracted by the filter.

2. The apparatus of claim 1, wherein the controller is configured to determine that the driver is in a hands-on state when the torque signal extracted by the filter is attenuated to be less than a reference torque signal, and is configured to determine that the driver is in a hands-off state when the torque signal is not attenuated.

3. The apparatus of claim 1, wherein the controller is configured to output a warning sound when the controller determines that the driver is in a hands-off state.

4. The apparatus of claim 1, wherein the filter includes a band pass filter.

5. The apparatus of claim 1, wherein the vibration generator includes an active suspension.

6. The apparatus of claim 1, wherein the vibration generator includes a motor.

7. The apparatus of claim 6, wherein the motor includes a motor configured for a motor driven power steering (MPDS) equipped in the vehicle.

8. A method of detecting a driver's hands-off, the method comprising:
detecting, by a torque sensor, a first torque signal generated from a steering wheel of a vehicle;
activating, by a controller, a vibration generator configured to provide a reference vibration to the steering wheel of the vehicle when a change rate of the detected first torque signal does not exceed a threshold value;
detecting, by the torque sensor, a second torque signal generated from the steering wheel of the vehicle;
extracting a torque signal of a vibration frequency band from the second torque signal; and
determining, by the controller, whether the driver's hands-off occurs based on a change of the extracted torque signal.

9. The method of claim 8, wherein the determining of the driver's hands-off includes:
determining that the driver is in a hands-on state when the torque signal of the vibration frequency band is attenuated to be less than a reference torque signal, and determining that the driver is in a hands-off state when the torque signal is not attenuated.

10. The method of claim 8, further including:
outputting a warning sound when the driver is determined to be in the hands-off state.

11. The method of claim 8, wherein the filter includes a band pass filter (BPF).

12. An apparatus for detecting a driver's hands-off, the apparatus comprising:
a torque sensor configured to detect a torque signal generated from a steering wheel of a vehicle;
an impedimetric sensor configured to measure an impedance of the driver from the steering wheel of the vehicle; and
a controller configured to determine whether the driver's hands-off occurs based on a change of the impedance measured by the impedimetric sensor when a change rate of the measured torque signal does not exceed a threshold value.

13. The apparatus of claim 12, wherein the controller is configured to determine that the driver is in a hands-off state when a difference between a reference impedance and the impedance measured by the impedimetric sensor exceeds the threshold value, and is configured to determine that the driver is in a hands-on state when the difference does not exceed the threshold value.

14. The apparatus of claim 12, wherein the controller is configured to output a warning sound when the controller determines that the driver is in a hands-off state.

15. The apparatus of claim 12, wherein the vibration generator includes an active suspension (AS).

16. The apparatus of claim 12, wherein the vibration generator includes a motor.

17. The apparatus of claim 16, wherein the motor includes a motor configured for a motor driven power steering (MPDS) equipped in the vehicle.

* * * * *